United States Patent Office 3,489,054
Patented Jan. 13, 1970

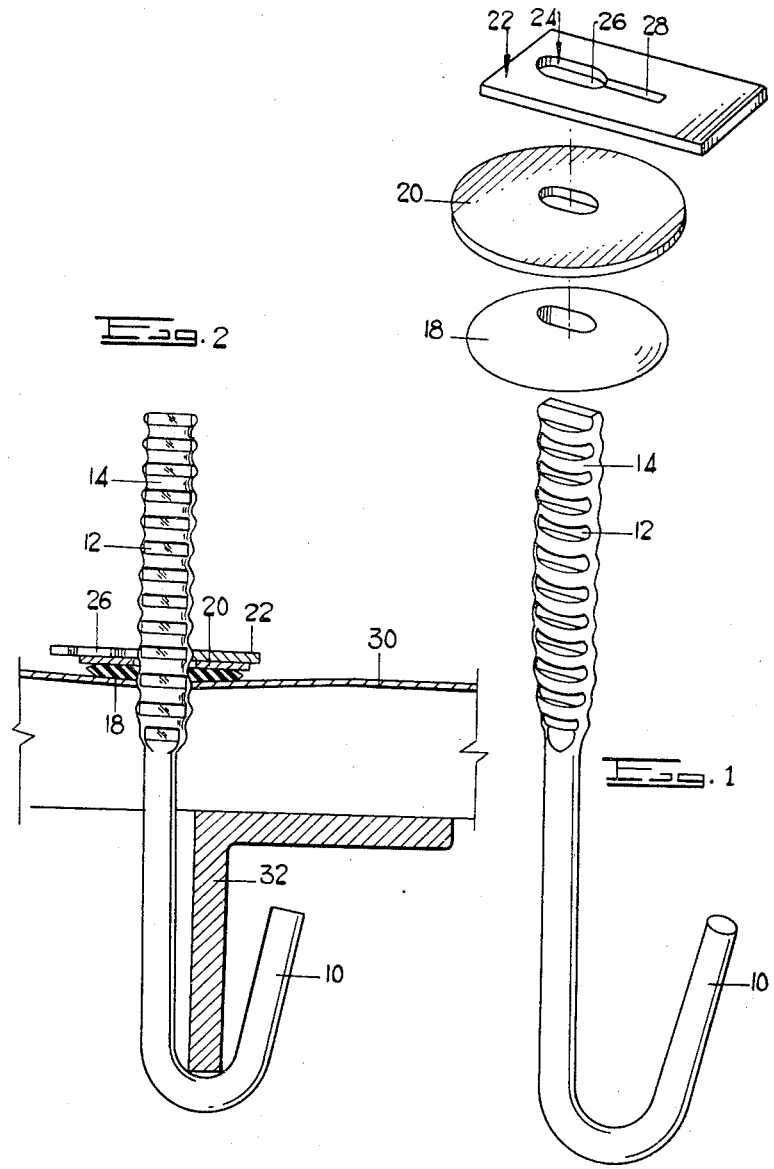

3,489,054
ANCHOR BOLTS
Pinchas Feldman, 103 Amberley, 6 O'Reilly Road, Berea, Transvaal, Johannesburg, Republic of South Africa
Filed Sept. 13, 1968, Ser. No. 759,626
Claims priority, application Republic of South Africa, Sept. 22, 1967, 67/5,695
Int. Cl. F16b *19/00, 1/00*
U.S. Cl. 85—8.6         8 Claims

ABSTRACT OF THE DISCLOSURE

An anchor bolt is provided at one end with a series of parallel-sided waists each separated from adjacent waists by a hip, the cross-sectional area of each waist being substantially equal to the cross-sectional area of the unwaisted portion of the shank of the bolt. A detachable forked member has prongs which straddle one of the waists with a tight fit.

---

This invention relates to anchor bolts and in particular to hook bolts of the kind used to secure sheets to purlins.

An anchor bolt of conventional design consists of a shank which isp rovided with a formation for engaging structure at one end and the other end of which is threaded to receive a suitable nut. One such anchor bolt is provided at the one end with a hook for engaging a purlin and is known as a hook bolt.

As the threaded end of the anchor bolt has to provide maximum projection from the sheet or the like being secured, it often happens that considerable screwing has to be effected to secure the anchor bolt in place. At the best of times a screwing operation is time-consuming.

To overcome this disadvantage, it has been proposed in French patent specification No. 1,391,092 to replace the nut with a detachable forked member, the prongs of which are adapted to make a tight fit between two adjacent turns of the thread, to secure an anchor bolt such as a hook bolt in place.

According to another proposal (U.S. Patent No. 2,235,530), the thread and nut are replaced by a series of shoulders and a detachable forked member. The prongs of the forked member are adapted to make a tight fit between two adjacent shoulders.

The present invention has for its object the provision of an improved anchor bolt of the kind described which is particularly suitable for securing corrugated metal sheets to purlins.

An anchor bolt according to the invention, comprises a shank having a structure-engaging formation at one end and a waisted portion at the other end, the waisted portion having a series of parallel-sided waists each separated from adjacent waists by a hip, the cross-sectional area of each waist being substantially equal to the cross-sectional area of the unwaisted portion of the shank, and a detachable forked member, the prongs of which are adapted to straddle a waist with a tight fit.

In the anchor bolt of the invention, the cross-sectional area of each waist is substantially equal to the cross-sectional area of the unwaisted portion and thus there are no areas of local weakness in the anchor bolt. However, in the prior art proposals, local areas of weakness are indeed formed. In the structure of the aforementioned French patent the areas of local weakness are formed at the root of the thread, while in the proposal of U.S. Patent No. 2,235,538, these are formed between the shoulders where the cross-sectional area is less than that of the unshouldered portion of the bolt.

Therefore, the present invention provides a distinct advantage over the prior art structures and is able to withstand greater shearing forces.

According to a feature of the invention, the waists are formed by pressing identical opposed slots into the thickness of the metal.

The forked member is conveniently a key-hole plate the larger part of which passes over the deformed shank and the narrower slot of which engages across the waists.

An anchor bolt assembly also includes washers. In an assembly according to the invention, the washers are formed with apertures complemental to the hips.

In the accompanying drawing which illustrates by way of example a preferred embodiment of the invention:

FIGURE 1 is an exploded perspective view of an anchor bolt of the invention; and FIGURE 2 is a view showing the anchor bolt securing a corrugated sheet to a purlin.

In the illustrated embodiment, an anchor bolt is formed by forming a rod of suitable steel with a hook 10. The straight end of the shank is then hot pressed or forged from both sides to indent the end with a series of opposed slots 12 into the shank to form a series of waists. This operation flattens the metal between the slots without reducing the total cross-sectional area. The resulting hips 14 are of elongated oval cross-section.

The deformed shank is threaded through washers with oval holes complemental to the hips 14. The lower washer 18 is made of a suitable sealing material and the upper washer 20 is made of galvanised metal in the conventional way. Of course a single lead washer may be used, if desired.

The securing element is a plate 22 with a keyhole 24 in it. The keyhole 24 is formed with an oval part 26 which is larger than the hip ovals, and a slot 28 leading from the oval part 26, the slot being the width of the thickness of metal between the slots 12 in the shank, i.e. the thickness of the waists.

Referring to FIGURE 2, in use of anchor bolt of the invention is installed as follows. First an oval hole for the deformed shank is punched in a sheet 30 at a suitable position over a purlin 32. The shank is passed through the hole held on top of the sheet and the hook 10 engages with the purlin 32.

It should be noted that the punched hole should be correctly orientated. Thus if the hook is in a plane parallel to the long axis of the ovals of the hips, the punched hole should have its long axis substantially at right angles to the direction in which the purlin runs. Fortunately a fairly large angular deviation can be tolerated.

Next the washers 18 and 20 are threaded over the projecting portion of the shank and then the keyhole plate 22 threaded on. The sheet 30 is then slightly depressed as shown in FIGURE 2 and the slot 28 in the keyhole plate 22 knocked over the last exposed waist.

The only tools required are a hammer for knocking the plates and punching the holes and a punch, or a specially-designed lever tool.

The invention may be applied to other uses as desired.

I claim:

1. An anchor bolt comprising a shank having a structure-engaging formation at one end and a waisted portion at the other end, the waisted portion having a longitudinally directed series of parallel-sided waists defining portions of a transverse thickness less than that of the remainder of the shank, each waists separated from adjacent waists by a portion of enlarged transverse thickness defining a hip, the cross-sectional area of each waist being substantially equal to the cross-sectional area of the unwaisted portion of the shank and the cross-sectional area of each hip, and a detachable forked member, the prongs of which are adapted to straddle a waist with a tight fit.

2. An anchor bolt as claimed in claim 1 wherein each waist is formed by two identical opposed slots in the waisted portion.

3. An anchor bolt as claimed in claim 2, wherein the forked member is a keyhole plate, the larger aperture of which is adapted to pass freely over the waisted portion and the narrower slot of which forms the fork.

4. An anchor bolt as claimed in claim 3 in combination with at least one washer with an aperture complemental to the hips of the waisted portion.

5. An anchor bolt as claimed in claim 1, wherein the structure-engaging formation is a hook.

6. An anchor bolt comprising a shank having a structure-engaging formation at one end and a waisted portion at the other end, the unwaisted portion of the shank being a round rod, the waisted portion of the shank having a longitudinally directed series of parallel-sided waists each separated from adjacent waists by a hip, the cross-sectional area of each waist being substantially equal to the cross-sectional area of the rod, the transverse length of each waist being substantially greater than the diameter of the rod, the transverse thickness of each waist being substantially less than the diameter of the rod, the hips defining portions of enlarged transverse thickness of elongated oval cross section and having a transverse length greater than the diameter of the rod.

7. An anchor bolt as claimed in claim 6, each waist being formed by two identical opposed slots in the waisted portion of the shank, the bottoms of the slots being flat.

8. An anchor bolt as claimed in claim 7, said bottoms of the slots being of a length greater than the diameter of the rod.

References Cited

UNITED STATES PATENTS

| | | | |
|---|---|---|---|
| 441,849 | 12/1890 | Locke et al. | 85—47 X |
| 2,408,366 | 10/1946 | Boyer. | |
| 2,621,064 | 12/1952 | Ware | 85—8.6 X |

FOREIGN PATENTS

| | | |
|---|---|---|
| 120,473 | 10/1945 | Australia. |
| 650,741 | 2/1951 | Great Britain. |

RAMON S. BRITTS, Primary Examiner

U.S. Cl. X.R.

287—189.36